United States Patent [19]
Suzuki

[11] Patent Number: 5,801,661
[45] Date of Patent: Sep. 1, 1998

[54] ANTENNA SWITCHING CIRCUIT SUITABLE FOR A RADIO-FREQUENCY APPARATUS WITH A BUILT-IN ANTENNA

[75] Inventor: Hiroshi Suzuki, Amagasaki, Japan

[73] Assignee: Mitsubishi Denki Kabushiki Kaisha, Tokyo, Japan

[21] Appl. No.: 502,176

[22] Filed: Jul. 13, 1995

[30] Foreign Application Priority Data

Dec. 19, 1994 [JP] Japan ...................................... 6-314847

[51] Int. Cl.$^6$ ...................................... H01Q 1/24
[52] U.S. Cl. ...................................... 343/702; 455/89; 455/90
[58] Field of Search ...................................... 343/702, 906, 343/876, 850, 853; 455/89, 90, 277.1, 277.2; H01Q 1/24

[56] References Cited

U.S. PATENT DOCUMENTS

| | | | |
|---|---|---|---|
| 3,781,893 | 12/1973 | Beukers et al. | 343/702 |
| 4,958,382 | 9/1990 | Imanishi | 343/702 |
| 5,121,504 | 6/1992 | Toko | 455/90 |
| 5,255,001 | 10/1993 | Tamura et al. | 343/702 |

OTHER PUBLICATIONS

Matsushita Denki Kougyou Kabushiki Kaisha, Jan. 1994, Brochure of AX Type Connector.

*Primary Examiner*—Hoanganh T. Le
*Attorney, Agent, or Firm*—Rothwell, Figg, Ernst & Kurz

[57] ABSTRACT

An antenna switching circuit for a portable radio-frequency apparatus, such as a portable telephone, provides an antenna switching circuit which enables switching of a radio-frequency signal path passing through an antenna, between a built-in antenna and an external antenna, and which increases the degree of freedom in arranging the components of the apparatus, which comprises a built-in antenna 3, an external-antenna connector 2a and a radio-frequency cable 6 serving as a path for radio-frequency signals, with an electrical control switch 11 for selecting either the built-in antenna 3 or the external-antenna connector 2a.

19 Claims, 9 Drawing Sheets

ANTENNA SWITCHING CIRCUIT SUITABLE FOR A RADIO-FREQUENCY APPARATUS WITH A BUILT-IN ANTENNA

FIELD OF THE INVENTION

This invention relates to an antenna switching circuit of a radio-frequency apparatus having a built-in antenna, and more particularly, to an antenna circuit in which the radio-frequency signal path is switched between an antenna built into the radio-frequency apparatus and an external-antenna connection means connecting an external antenna to the radio-frequency apparatus.

DESCRIPTION OF THE RELATED ART

When a portable telephone radio apparatus is used as a portable telephone, an antenna built into the portable telephone radio apparatus is used for communication. When the portable telephone radio apparatus is used in a car as a car telephone, an external antenna mounted to the car is usually used. In a radio-frequency apparatus which switches between internal and external antennas such as the portable telephone radio apparatus described above, a circuit which switches the path for radio-frequency signals between the built-in antenna and the external-antenna connector connecting to the external antenna is conventionally configured as shown in FIG. 9. In FIG. 9, the circuit comprises a mechanical switch 51, which is opened or closed as the plug of the external antenna is mounted or removed; and comprises an external-antenna connector 52, which is incorporated with the mechanical switch 51, a built-in antenna 53, a radio-frequency circuit 54 for handling the radio-frequency signal to be transmitted through or received from either antenna, and radio-frequency cables 55 and 56 serving as a path for the radio-frequency signals.

When the plug of the external antenna is not connected, the contact of the mechanical switch 51 is closed, connecting the radio-frequency cables 55 and 56. In this condition, the path for radio-frequency signals is connected to the built-in antenna 53 through the mechanical switch 51. When the plug of the external antenna is connected, the path for radio-frequency signals is connected to the external antenna through the external-antenna connector 52. At the same time, when the plug of the external antenna is connected to the external-antenna connector 52, the contact of the mechanical switch 51 is opened, separating the built-in antenna 53 from the path for radio-frequency signals. As described above, the path for radio-frequency signals is connected to the external-antenna connector 52 or the built-in antenna 53 depending on whether the plug of the external antenna is connected.

The conventional antenna switching circuit is configured as described above. Since the mechanical switch 51 is incorporated with the external-antenna connector 52, the radio-frequency signal passes through the external-antenna connector 52 even when the path for radio-frequency signals is connected to the built-in antenna. This is a restriction which reduces the degree of freedom in arranging the radio-frequency cable 55, the radio-frequency cable 56, and other components all of which serve as the path for radio-frequency signals.

Furthermore, the mechanical switch 51 is opened or closed only by mounting or removing the plug of the external antenna, which does not allow a change-over between the internal and external antennas to be performed in any other manner.

SUMMARY OF THE INVENTION

It is an object of the present invention to eliminate the above-described problems. More specifically, it is an object of the present invention to increase the degree of freedom in arranging the radio-frequency cables and other components.

It is another object of the invention to provide an antenna switching circuit which allows change-over between internal and external antennas to be performed regardless of whether the plug of the external antenna is mounted or removed.

In one embodiment of the present invention, an antenna switching circuit suitable for a portable radio-frequency apparatus according to the invention comprises: a first antenna mounted on said portable radio-frequency apparatus; an external-antenna connection means positioned on said portable radio-frequency apparatus for connecting to an external antenna; and a radio-frequency signal switching means responsive to an electrical control signal for switching, in response to the electrical control signal, the path for radio-frequency signals to be transmitted or received between said first antenna and said external-antenna connection means.

In another embodiment, an antenna switching circuit suitable for a portable radio-frequency apparatus according to the invention comprises: a built-in antenna mounted on said portable radio-frequency apparatus; an external-antenna connector positioned on said portable radio-frequency apparatus for connecting to an external antenna; and an electrical control switch responsive to an electrical control signal for switching, in response to the electrical control signal, the path for radio-frequency signals to be transmitted or received, between said built-in antenna and said external-antenna connector, wherein the built-in antenna and the external-antenna connector are positioned in close proximity to each other so that the path from said built-in antenna to said electrical control switch is shorter than the path from said external-antenna connector to said electrical control switch.

In still another embodiment, an antenna switching circuit suitable for a portable telephone radio apparatus according to the invention comprises: a built-in antenna mounted on said portable telephone radio apparatus; an external-antenna connector positioned on said portable telephone radio apparatus for connecting to an external antenna; an electrical control switch responsive to an electrical control signal for switching, in response to said electrical control signal, the path for radio-frequency signals to be transmitted or received, between said built-in antenna and said external-antenna connector; and a control circuit for outputting said electrical control signal controlling said electrical control switch, wherein said built-in antenna and said electrical control switch are positioned in close proximity to each other so that the path from said built-in antenna to said electrical control switch is shorter than the path from said external-antenna connector to said electrical control switch.

Accordingly, with an antenna switching circuit suitable for a portable radio-frequency apparatus according to the present invention, a radio-frequency signal switching means responsive to an electrical control signal switches the path for radio-frequency signals between the first antenna and the external antenna connection means with the use of electrical control, whereby electrical control is used to independently switch the first antenna and the external antenna connection means.

In addition, with an antenna switching circuit suitable for a portable radio-frequency apparatus according to the invention, the path between the built-in antenna and the electrical control switch is shorter than the path between the external-antenna connector and the electrical control switch, whereby the path from the built-in antenna to the electrical control switch becomes shorter, so that the effects of radio-frequency signal noise on the built-in antenna and the power loss of radio frequency signals are reduced.

Other objects and advantages of this invention will become apparent from the detailed description given hereinafter. It should be understood, however, that the detailed description and specific embodiment are provided by way of illustration only since various changes and modifications within the spirit and scope of the invention will become apparent to the those skilled in the art from the following detailed description.

BRIEF DESCRIPTION OF THE DRAWINGS

In all of the figures, elements which are the same or substantially the same are labeled and referred to by the same reference numerals.

DESCRIPTION OF PREFERRED EMBODIMENTS

Embodiment 1

A first embodiment of the invention will be described below with reference to drawings.

Figure 1:
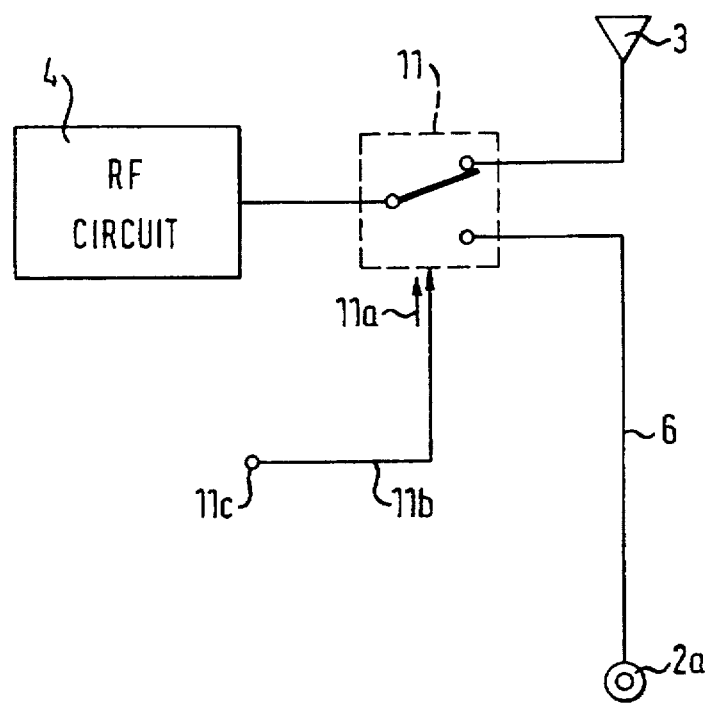
FIG. 1 is a block diagram showing an antenna switching circuit according to a first embodiment of the invention.

FIG. 1 is a block diagram illustrating an antenna switching circuit according to a first embodiment of the invention. A portable telephone serving as a radio-frequency apparatus comprises an external-antenna connector 2a as an external-antenna connection means, a built-in antenna 3, and a radio-frequency circuit 4 which handles radio-frequency signals to be transmitted and received via the internal and external antennas. In FIG. 1, an electrical control switch 11 for switching radio-frequency signals acts as a switching means and switches, in response to a control signal 11a applied on line 11b from a control signal input terminal 11c, the path for radio-frequency signals between a built-in antenna 3 and an external-antenna connector 2a which is connected by a radio-frequency cable 6.

The operation of the circuit will be described below. In FIG. 1, when the control signal 11a is input on line 11b to the electrical control switch 11 from the control signal input terminal 11c, the electrical control switch 11 switches from the state shown in FIG. 1 to the external-antenna connector 2a side, thereby connecting a path for radio-frequency signals between the radio-frequency circuit 4 and the external-antenna connector 2a. When the control signal 11a is removed from the line 11b, the electrical control switch 11 returns to the state as shown in FIG. 1. The control signal 11a may be applied to the input terminal 11c in any manner, such as by means of manual control or by other means as employed in the other embodiments described below.

Figure 9:
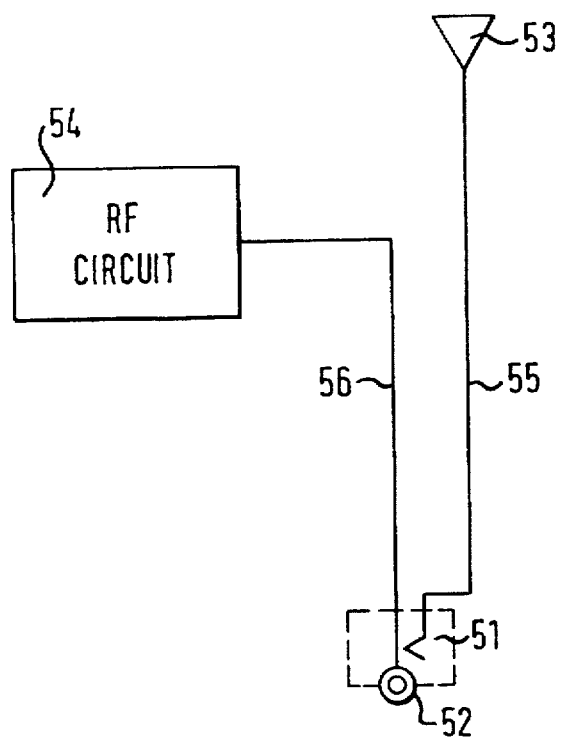
FIG. 9 is a block diagram showing an antenna switching circuit according to the prior art.

When the antenna switching circuit is configured as described above, switching of the circuit does not depend on whether the external antenna as a second antenna is plugged-in or removed, unlike the conventional technique shown in FIG. 9. Therefore, the positional relationship between the external-antenna connector 2a and the electrical control switch 11 can be freely arranged, and switching between the built-in antenna 3 serving as a first antenna and the external-antenna connector 2a can be freely selected with the control signal.

Embodiment 2

Figure 2:
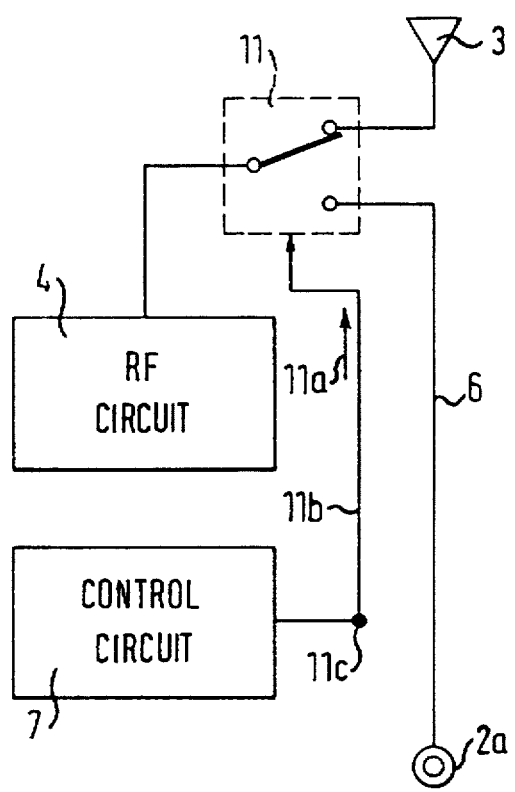
FIG. 2 is a block diagram showing an antenna switching circuit according to a second embodiment of the invention.

FIG. 2 is a block diagram illustrating an antenna switching circuit according to another embodiment of the invention. In FIGS. 1–2, since the same or the substantially same elements are identified by the same reference numerals, the descriptions of those elements will be omitted. In FIG. 2, the circuit is arranged such that the upper section comprises a radio-frequency circuit 4 and a built-in antenna 3 and the lower section comprises an external-antenna connector 2a and a control circuit 7 which at least controls the application of control signal 11a through input terminal 11c on line 11b to electrical control switch 11. In this embodiment, the built-in antenna 3 and the radio-frequency circuit 4 are placed physically in very close proximity to the electrical control switch 11.

In the conventional technique, as shown in FIG. 9, two radio-frequency cables are required, one cable between the radio-frequency circuit 54 and the external-antenna connector 52, and the other cable between the external-antenna connector 52 and the built-in antenna 53. In the configuration shown in FIG. 2, since the built-in antenna 3 and the radio-frequency circuit 4 are arranged in very close proximity to the electrical control switch 11, only one radio-frequency cable 6 serving as the path for radio-frequency signals between the electrical control switch 11 and the external-antenna connector 2a is required. Furthermore, in this configuration, because the path for radio-frequency signals between the radio-frequency circuit 4 and the built-in antenna 3 thus becomes very short, power loss caused by radio-frequency signals when the built-in antenna is used is substantially reduced, and the effects of noise are also reduced in both directions between the control circuit 7 and the radio-frequency signal. The control circuit 7 may be operated in any suitable manner such as manually or by other means as described below.

Embodiment 3

Figure 3:
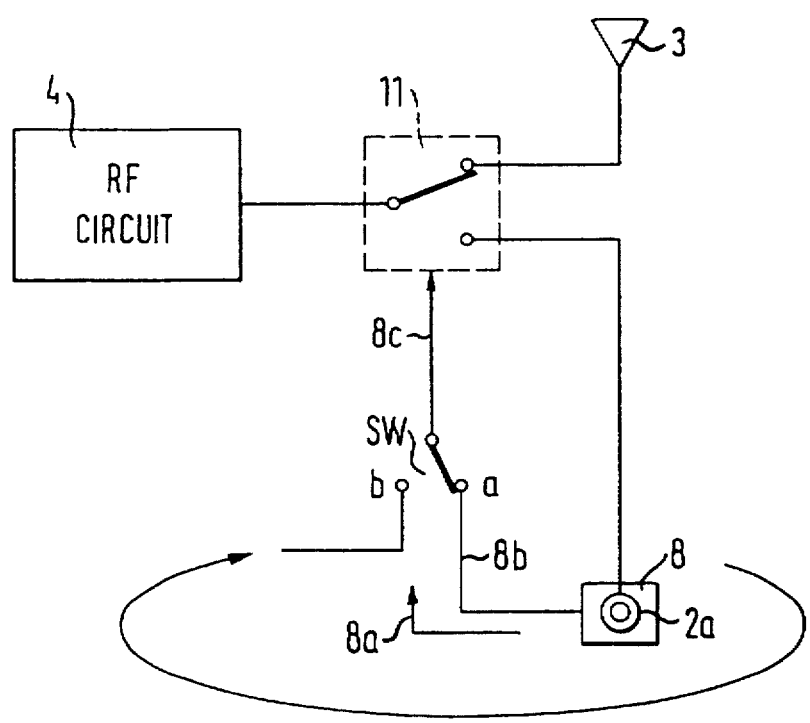
FIG. 3 is a block diagram showing an antenna switching circuit according to a third embodiment of the invention.

FIG. 3 is a block diagram illustrating an antenna switching circuit according to still another embodiment of the invention. In FIGS. 1–3, since the same or the substantially same elements are identified by the same reference numerals, the descriptions of those elements will be omitted. In FIG. 3, a plug-in sensor and control signal generator 8 is positioned at the external-antenna connector 2a and acts as a connecting detection means to detect whether the plug of the external antenna is inserted in or removed from the external-antenna connector 2a and to generate a control signal when the plug of the external antenna is inserted into the connector 2a.

The operation of the circuit will be described below. When the sensor 8 detects the insertion of the plug of the external antenna into the external-antenna connector 2a, the sensor 8 generates and outputs a control signal 8a along lines 8b and 8c through switch SW to the electrical control switch 11. When the electrical control switch 11 receives the control signal 8a, the electrical control switch 11 switches the path for radio-frequency signals from the state shown in FIG. 3 to the external-antenna connector 2a.

When the antenna switching circuit is configured as described above, inserting the plug of the external antenna into the external-antenna connector 2a automatically switches the path for radio-frequency signals to the external antenna side, and the positional relationship between the external-antenna connector 2a and the electrical control switch 11 can therefore be more freely arranged. In addition, if a mode switch SW is set to the b side by manual operation, automatic switching can be taken off.

Embodiment 4

Figure 4:
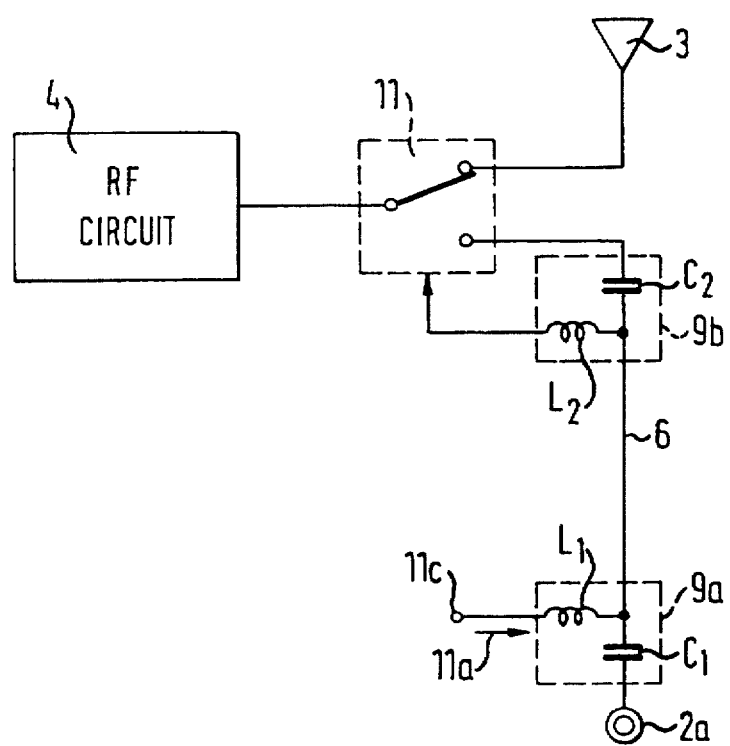
FIG. 4 is a block diagram showing an antenna switching circuit according to a fourth embodiment of the invention.

FIG. 4 is a block diagram illustrating an antenna change-over circuit according to yet another embodiment of the invention. In FIGS. 1–4, since the same or the substantially same elements are identified by the same reference numerals, the descriptions of those elements will be omitted. In FIG. 4, electrical filters 9a and 9b are connected in radio-frequency cable 6 between connector 2a and control switch 11. Filter 9a functions as a control-signal connection means and comprises an inductance L1 and a capacitor C1. Filter 9b functions as an electrical control signal extraction means and comprises an inductance L2 and a capacitor C2.

The operation of the circuit will be described below. When a direct-current control signal 11a is used to control the electrical control switch 11 and is input at control signal input 11c to the filter 9a through inductance L1, the direct-current control signal passes through the inductance L1 to the radio-frequency cable 6. However, the capacitor C1 prevents the control signal from flowing to the connector 2a on the external antenna side. The inductance L2 of the filter 9b conducts the direct-current control signal flowing through the radio-frequency cable 6 and inputs it into the electrical control switch 11. However, the capacitor C2 prevents the direct-current control signal from flowing through the electrical control switch 11 to the radio-frequency circuit 4. When a radio-frequency signal is applied to the radio-frequency cable 6, the inductances L1 and L2 prevent the radio-frequency signal from leaking to the control switch 11 and to the control signal input 11c while the radio-frequency signal passes through the capacitors C1 and C2.

When the antenna switching circuit is configured as described above, the radio-frequency cable 6 can be used both as a path for control signals input to the electrical control switch 11 and as a path for the radio frequency signals. In this case, when the control circuit (not shown in FIG. 4) for generating the control signal 11a is positioned at a distance from the electrical control switch 11 and close to the external-antenna connector 2a, the wiring path for the control signal 11a is greatly shortened and simplified.

Embodiment 5

Figure 5:
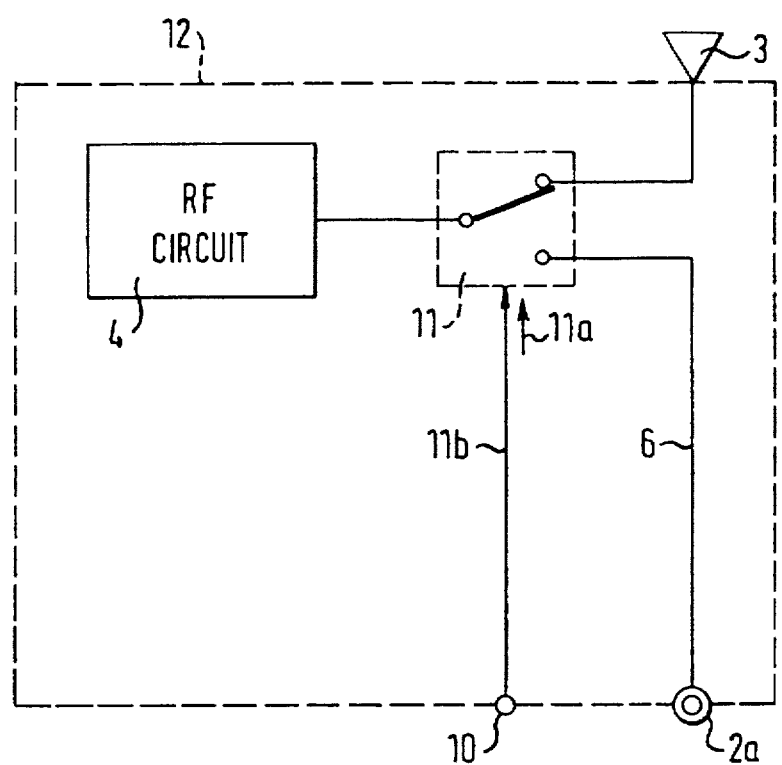
FIG. 5 is a block diagram showing an antenna switching circuit according to a fifth embodiment of the invention.

FIG. 5 is a block diagram illustrating an antenna switching circuit according to a further embodiment of the present invention. In FIGS. 1–5, since the same or the substantially same elements are indicated by the same reference numerals, the descriptions of those elements will be omitted. In FIG. 5, a radio-frequency apparatus 12 includes an input terminal 10 which functions as a control signal connection means for inputting a control signal 11a along dedicated line 11b for controlling electrical control switch 11, an external-antenna connector 2a, a built-in antenna 3, a radio-frequency circuit 4, a radio-frequency cable 6, and the electrical control switch 11.

When the antenna change-over circuit is configured as shown in FIG. 5 as described above, a control signal 11a for controlling the electrical control switch 11 can be inputted from a source outside of the radio-frequency apparatus 12 for switching the path for radio-frequency signals between the built-in antenna 3 and the external-antenna connector 2a, thereby enabling remote operation.

Figure 6:
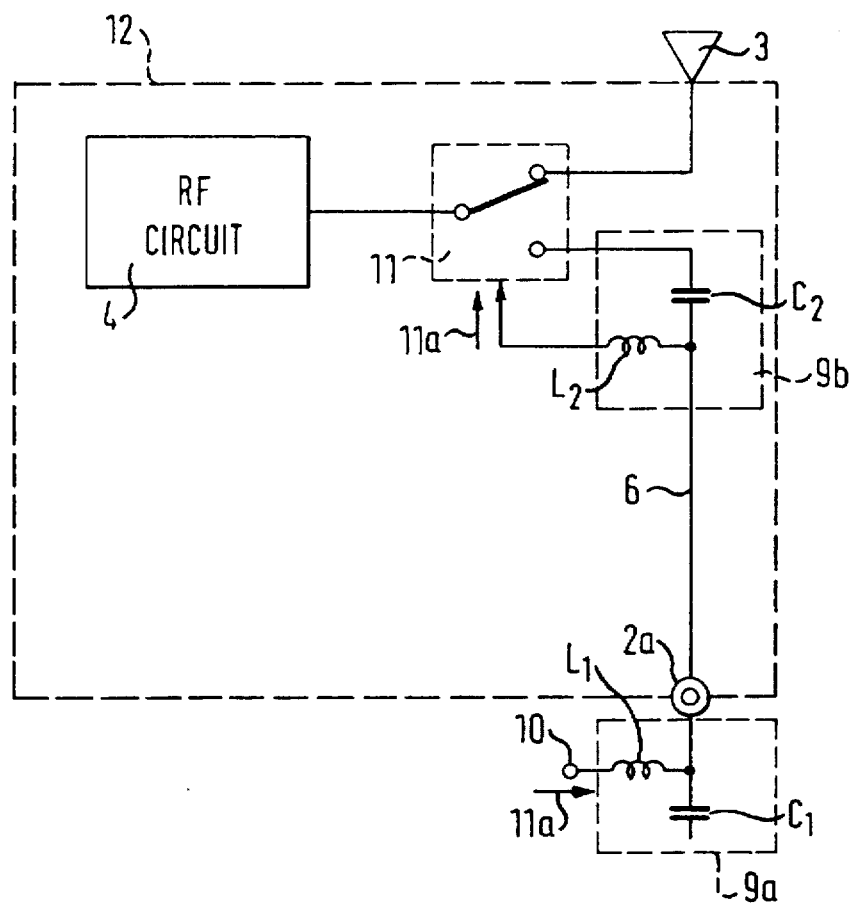
FIG. 6 is a block diagram showing another antenna switching circuit according to the fifth embodiment of the invention.

In this embodiment, an example of inputting a control signal 11a from the input terminal 10 through the dedicated path 11b to the electrical control switch 11 is described. As shown in FIG. 6, however, the radio-frequency cable 6 can also be used as the path for control signals 11a. A variation of the embodiment of FIG. 5 is shown in FIG. 6 and combines the configuration shown in FIG. 5 together with the filters 9a and 9b as shown in FIG. 4. As shown in FIG. 6, a control signal 11a is input to the input terminal 10, and the filters 9a and 9b separate the control signal from the radio-frequency signal in the manner as described above for the embodiment of FIG. 4, thereby allowing remote operation as described in connection with FIG. 5 and the common use of the line 6 for both control signal 11a and the radio frequency signals as described for FIG. 4.

Embodiment 6

Figure 7:
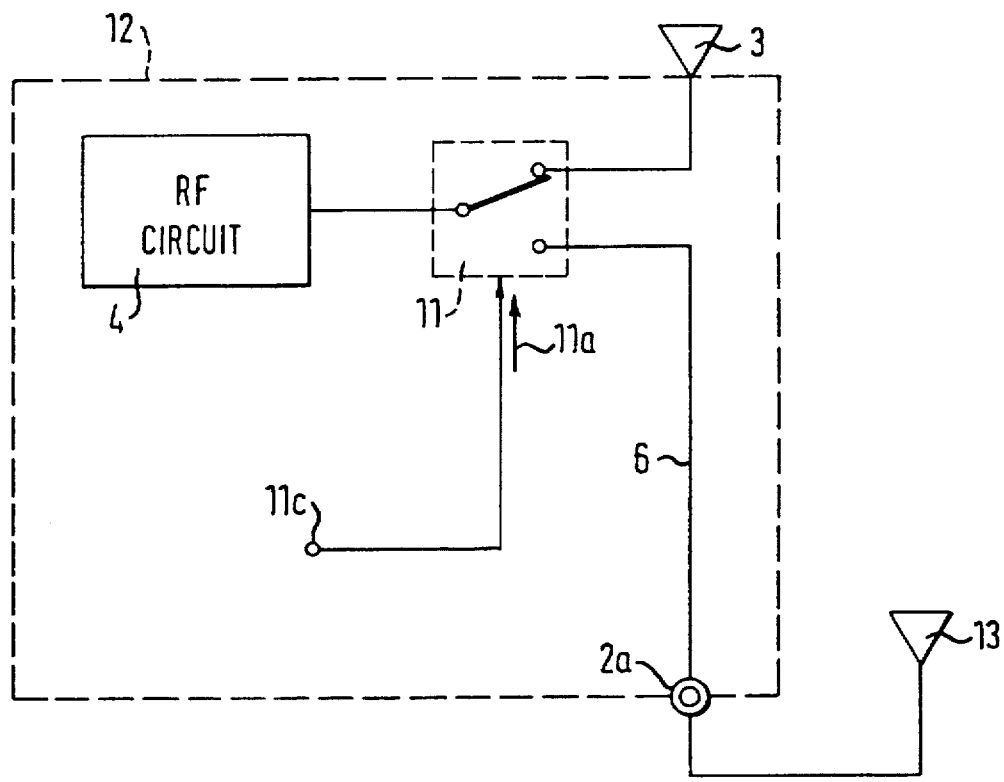
FIG. 7 is a block diagram showing an antenna switching circuit according to a sixth embodiment of the invention.

FIG. 7 is a block diagram illustrating an antenna switching circuit according to a yet another embodiment of the invention. In FIGS. 1–7, since the same or the substantially same elements are identified by the same reference numerals, the descriptions of those elements will be omitted. In the embodiment of FIG. 7, radio-frequency apparatus 12 includes the antenna change-over circuit comprising radio frequency circuit 4 and control switch 11. An external antenna 13 is connected to an external-antenna connector 2a.

In the antenna switching circuit configured as shown in FIG. 7, the electrical control switch 11 is switched by inputting a control signal 11a at control signal input terminal 11c with the built-in antenna 3 and the external antenna 13 both being mounted in place, whereby the electrical control switch 11 selects either of the antennas 3 or 13. In this embodiment, both of the antennas can remain connected and either can be selected for operation by inputting control signal 11a at the terminal 11c.

Embodiment 7

Figure 8:
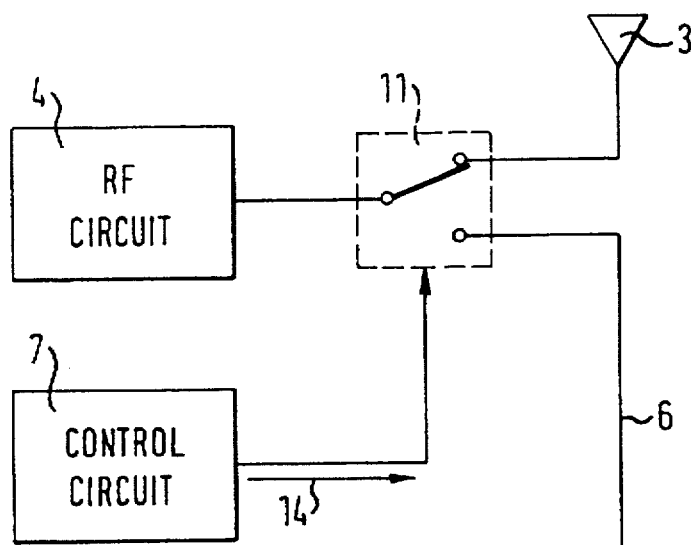
FIG. 8 is a block diagram showing an antenna switching circuit according to a seventh embodiment of the invention.
Figure 8A:
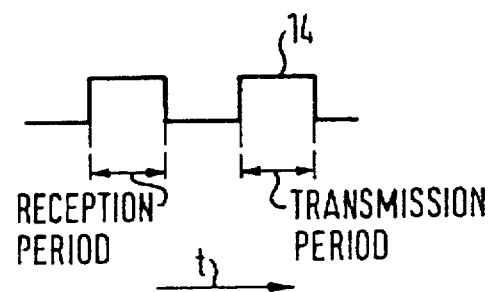
FIG. 8A is an illustration of the characteristics of the control signal of the embodiment of FIG. 8 as a function of time.

FIG. 8 is a block diagram illustrating an antenna switching circuit according to a still further embodiment of the invention which may be used, for example, in a burst transmission and reception radio apparatus. In FIGS. 1–8, since the same or the substantially same elements are indicated by the same reference numerals, the descriptions of those elements will be omitted. In FIG. 8, a control circuit 7 outputs a control signal 14 to an electrical control switch 11. The control signal 14 is an intermittent signal as shown in FIG. 8A and is output to the electrical control switch 11 by the control circuit 7 in synchronism with the timing of the reception period and the transmission period (as labeled in FIG. 8A) during which the radio-frequency apparatus switching circuit receives and transmits. Receiving this intermittent control signal 14, the electrical control switch 11 operates so that either an internal antenna 3 or an external-antenna connector 2a is selected.

When the antenna switching circuit is configured as described above, as applied to radio-frequency apparatus which performs burst transmission and reception, wherein during the periods between burst transmission and reception, that is, during the time periods when the built-in antenna 3 or the external antenna is not active, a control signal is not applied to the electrical control switch 11. Therefore, compared with the above-described embodiments, the power required for control signals and for driving the electrical control switch 11 is saved since the power is turned on only during the active burst transmission and reception periods.

As described above, in connection with the embodiments of the invention set forth, the following advantages are obtained:

(1) The antenna switching circuit is arranged such that the radio-frequency signal switching means switches the path for radio-frequency signals between the first antenna and the external antenna connection means with use of electrical control, whereby instead of the conventional mechanical switch, electrical control can freely switch the first antenna and the external antenna connection means, and the positional relationship between the external antenna connection means and the radio-frequency signal switching means can be more freely arranged.

(2) The antenna switching circuit is arranged such that the path between the first antenna and the radio-frequency signal switching means is shorter than the path between the external antenna connection means and the above-described radio-frequency signal switching means, whereby the path from the first antenna to the radio-frequency signal switching means becomes shorter, the effects of radio-frequency signal noise on the first antenna and the power loss of radio-frequency signals are reduced, and the radio-frequency cable between the first antenna and the radio-frequency signal switching means can be omitted.

(3) The antenna switching circuit comprises a control signal connection means for connecting and transferring an electrical control signal for switching the path for radio-frequency signals between the first antenna and the external-antenna connection means, from a control signal source external to the radio-frequency apparatus to the radio-frequency signal switching means, whereby the antenna switching circuit can be switched with a command from a location remote from the radio-frequency apparatus.

(4) The antenna switching circuit comprises an electrical control signal extraction means for extracting the electrical control signal from signals flowing through the connection line and outputting the electrical control signal to the radio-frequency signal switching means, and in which the connection line which connects the external antenna connection means to the radio-frequency switching means can also be used as the path for electrical control signals, whereby wiring required for the path for electrical control signals can be greatly simplified.

(5) The antenna switching circuit comprises radio-frequency signal switching means for outputting an electrical control signal in synchronization with the timing of use of the first and second antennas, whereby the power required for electrical control signals is consumed only when the first antenna or the second antenna is used, thereby providing the advantage that the power required for driving the radio-frequency signal switching means is reduced.

(6) The antenna switching circuit comprises connection detection means for outputting to the radio-frequency signal switching means an electrical control signal which switches the path for radio-frequency signals to the external antenna connection means when the connection detection means detects the connection between the second antenna and the external antenna connection means, whereby connecting the second antenna to the external antenna connection means automatically switches the path for radio-frequency signals to the external antenna connection means, and the positional relationship between the external antenna connection means and the radio-frequency signal switching means can be more freely arranged.

(7) The antenna switching circuit provides means for switching the path for radio-frequency signals between the first antenna and the external antenna connection means with the second antenna being connected to the external antenna connection means, whereby the first antenna or the second antenna can be freely selected, and the positional relationship between the external antenna connection means and the radio-frequency signal switching means can be freely arranged.

The invention has been described with respect to certain preferred embodiments. Various modifications and additions within the spirit of the invention will occur to those of skill in the art. Accordingly, the scope of the invention is limited solely by the following claims.

What is claimed is:

1. An antenna switching circuit for a portable radio-frequency apparatus comprising:

a first antenna mounted on said portable radio-frequency apparatus;

an external antenna connection positioned on said portable radio-frequency apparatus for connecting said apparatus to an external antenna; and a radio-frequency signal switching means responsive to an electrical control signal for switching, in response to said electrical control signal, the path for radio-frequency signals to be transmitted or received between said first antenna and said external antenna connection.

2. An antenna switching circuit according to claim 1, wherein said first antenna and said radio-frequency signal switching means are positioned in close proximity to each other whereby the path from said first antenna to said radio-frequency signal switching means is shorter than the path from said external antenna connection to said radio-frequency signal switching means.

3. An antenna switching means according to claim 1, further comprising a control signal connection means for connecting to said radio-frequency signal switching means said electrical control signal from a source external to said radio-frequency apparatus for switching said path for radio-frequency signals between said first antenna and said external antenna connection in response to a control signal supplied from said external source.

4. An antenna switching circuit according to claim 1, further comprising:

a radio-frequency cable forming a path for radio-frequency signals between said external antenna connection means and said radio-frequency signal switching means; and a control-signal connection means connected to said radio-frequency cable for outputting an electrical control signal from said radio-frequency cable to said radio-frequency signal switching means;

said control-signal connection means including an electrical control signal extraction means connected to said radio-frequency cable for extracting said electrical control signal from said radio-frequency cable and for outputting said electrical control signal to said radio-frequency signal switching means.

5. An antenna switching circuit according to claim 4, wherein said control-signal connection means and said electrical control signal extraction means comprise a filter which includes at least an inductor and a capacitor.

6. An antenna switching circuit according to claim 1, further comprising a control circuit for outputting an intermittent electrical control signal for controlling said radio-frequency signal switching means in synchronism with time intervals during which said first antenna or said external antenna is used for transmission or reception.

7. An antenna switching circuit according to claim 1, further comprising a detection means for detecting the connection of said external antenna to said external antenna connection and for outputting to said radio-frequency signal switching means said electrical control signal for switching said path for radio-frequency signals to said external antenna connection when said connecting detection means detects the connection of said external antenna to said external antenna connection; and a mode switch connected between said detection means and said radio-frequency signal switching means, said mode switch connecting in one selected setting thereof and disconnecting in another selected setting thereof said electrical control signal from said detection means to said radio-frequency signal switching means.

8. An antenna switching circuit according to claim 1, wherein said radio-frequency signal switching means switches the path for radio-frequency signals to be transmitted or received between said first antenna and said external antenna connection while said external antenna is connected to said external antenna connection.

9. An antenna switching circuit for a portable radio-frequency apparatus comprising:

a built-in antenna mounted on said portable radio-frequency apparatus;

an external-antenna connector positioned on said portable radio-frequency apparatus for connecting to an external antenna; and an electrical control switch responsive to an electrical control signal for switching the path for radio-frequency signals to be transmitted or received between said built-in antenna and said external-antenna connector in response to said electrical control signal, wherein said built-in antenna and said electrical control switch are positioned in close proximity to each other whereby the path from said built-in antenna to said electrical control switch is shorter than the path from said external-antenna connector to said electrical control switch.

10. An antenna switching circuit according to claim 9, further comprising a control signal input terminal for inputting said electrical control signal to said electrical control switch from a source external to said portable radio-frequency apparatus for switching said path for radio-frequency signals between said built-in antenna and said external antenna connector.

11. An antenna switching circuit according to claim 9, further comprising:

a radio-frequency cable forming a path for radio-frequency signals between said external-antenna connector and said electrical control switch; and a control-signal connection means connected to said radio-frequency cable for outputting said electrical control signal from said radio-frequency cable to said electrical control switch;

said control-signal connection means including an electrical control signal extraction means connected to said radio-frequency cable for extracting said electrical control signal from said radio-frequency cable and for outputting said extracted electrical control signal to said electrical control switch.

12. An antenna switching circuit according to claim 11, wherein said control-signal connection means and said electrical control signal extraction means comprise a filter which includes at least an inductor and a capacitor.

13. An antenna switching circuit according to claim 9, further comprising a control circuit for outputting an intermittent electrical control signal for controlling said electrical control switch in synchronism with time intervals during which said built-in antenna or said external antenna is used for transmission or reception.

14. An antenna switching circuit according to claim 9, further comprising a plug-in sensor for sensing the connection of said external antenna to said external-antenna connector and for outputting to said electrical control switch an electrical control signal for switching said path for radio-frequency signals to said external-antenna connector when said plug-in sensor detects the connection of said external antenna to said external-antenna connector.

15. An antenna switching circuit according to claim 14, further comprising a mode switch connected between said plug-in sensor and said electrical control switch, said mode switch connecting in one selected setting thereof and disconnecting in another selected setting thereof said electrical control signal from said plug-in sensor to said control circuit.

16. An antenna switching circuit according to claim 9, wherein said electrical control switch switches the path for radio-frequency signals to be transmitted or received between said built-in antenna and said external-antenna connector while said external antenna is connected to said external-antenna connector.

17. An antenna switching circuit for a portable telephone radio apparatus comprising:

a built-in antenna mounted on said portable telephone radio apparatus;

an external-antenna connector positioned on said portable telephone radio apparatus for connecting to an external antenna;

an electrical control switch responsive to an electrical control signal for switching in response to said electrical control signal the path for radio-frequency signals to be transmitted or received between said built-in antenna and said external-antenna connector; and a control circuit for outputting said electrical control signal controlling said electrical control switch, wherein said built-in antenna and said electrical control switch are positioned in close proximity to each other whereby the path from said built-in antenna to said electrical control switch is shorter than the path from said external-antenna connector to said electrical control switch.

18. An antenna switching means according to claim 17, further comprising a control signal input terminal for inputting said electrical control signal to said electrical control switch from a source external to said portable radio-frequency apparatus for switching said path for radio-frequency signals between said built-in antenna and said external-antenna connector.

19. An antenna switching circuit according to claim 17, further comprising:

a plug-in sensor for sensing the connection of said external antenna to said external-antenna connector and for outputting an electrical control signal to said electrical control switch; and a mode switch connected between said plug-in sensor and said electrical control switch, said mode switch connecting in one selected setting thereof and disconnecting in another selected setting thereof said electrical control signal from said plug-in sensor to said control circuit.

* * * * *